(12) United States Patent
He et al.

(10) Patent No.: US 10,634,289 B2
(45) Date of Patent: Apr. 28, 2020

(54) LED LAMP WITH A TRANSPARENT TUBE AND AN END CAP

(71) Applicant: LEDVANCE GmbH, Garching bei Munich (DE)

(72) Inventors: Xiongqiang He, Guangdong (CN); Jianjian Huang, Guangdong (CN); WanPu Wang, Guangdong (CN); Shaozhu Yang, Guangdong (CN)

(73) Assignee: LEDVANCE GMBH, Garching bei Munich (DE)

( * ) Notice: Subject to any disclaimer, the term of this patent is extended or adjusted under 35 U.S.C. 154(b) by 0 days.

(21) Appl. No.: 16/377,685

(22) Filed: Apr. 8, 2019

(65) Prior Publication Data
US 2019/0309909 A1 Oct. 10, 2019

(30) Foreign Application Priority Data
Apr. 8, 2018 (CN) .......................... 2018 1 0306591

(51) Int. Cl.
*F21S 4/00* (2016.01)
*F21K 9/272* (2016.01)
*F21V 15/015* (2006.01)
*F21Y 103/10* (2016.01)
*F21Y 115/10* (2016.01)

(52) U.S. Cl.
CPC ............ *F21K 9/272* (2016.08); *F21V 15/015* (2013.01); *F21Y 2103/10* (2016.08); *F21Y 2115/10* (2016.08)

(58) Field of Classification Search
None
See application file for complete search history.

(56) References Cited

U.S. PATENT DOCUMENTS 9,903,582 B2 * 2/2018 Kizele ................. F21V 19/0045
10,408,388 B1 * 9/2019 Chartrand ............. F21V 23/003
2011/0260614 A1 10/2011 Hartikka et al.

* cited by examiner

*Primary Examiner* — Vip Patel
(74) *Attorney, Agent, or Firm* — Hayes Soloway PC

(57) ABSTRACT

An end cap for a retrofit LED lamp includes a transparent tube. An end cap is mounted to an end of the transparent tube. A pair of pins electrically and mechanically connects the LED lamp to a tube holder. The pair of pins extends through the end cap. A protective cap sits over the pair of pins thereby protecting the pair of pins from being touched by a user.

10 Claims, 5 Drawing Sheets

LED LAMP WITH A TRANSPARENT TUBE AND AN END CAP

CROSS-REFERENCE

This patent application claims priority from Chinese Patent Application No. 201810306591.3 filed Apr. 8, 2018, which is herein incorporated by reference in its entirety.

TECHNICAL FIELD

The present invention relates to an LED lamp with a transparent tube and an end cap for replacing a fluorescent tube lamp.

BACKGROUND

Traditional fluorescent tube lamps used in conventional luminaire housing have a straight, crescent or circular body with a maximum length of 2400 mm of the tube. Fluorescent tubes normally are low-pressure discharge lamps having a coating on the inner surface comprising a fluorescent material such as phosphor. The fluorescent tube lamp comprises an air-tight glass tube, an inert gas enclosed therein, and electrodes for igniting the inert gas. At each end of the fluorescent tube, there is a lid with two symmetrically positioned contact pins, to which the electrodes are connected. Electric power is provided via these two contact pins to the fluorescent tube.

Replacing a fluorescent tube, e.g. for the purpose of energy saving, with a retrofit LED lamp (afterwards also referred to as a LED lamp) is becoming common nowadays. Retrofit means replacing a fluorescent tube by a LED lamp without altering the luminaire housing of the fluorescent tube. The luminaire housing comprises a base, at least two tube holders as well as the electronic devices necessary for operating the fluorescent tube. Changing the fluorescent tube may not include the optional requirement of removing or replacing the starter or a load or ballast by something else.

When replacing a fluorescent tube with a LED lamp, an issue related to the possible occurrence of an electric shock during the assembly process of the LED lamp may occur. According to the safety regulations in the field of electricity, luminaire housings are constructed such that when a fluorescent tube is replaced, it is not possible to touch any voltage-carrying parts even if the fluorescent tube housing is not disconnected.

This requirement has also to be adhered even if the fluorescence tube is replaced in such a way that only one end of the tube is in contact with the contacts of one of the tube holders of the luminaire housing so that the person replacing the tube could possibly touch the other (open) end of the tube.

This requirement is met automatically with a fluorescent tube because no current flows through the gas-filled fluorescent tube before the gas in the tube is ionized by a voltage pulse. This starting pulse is generated by the ballast. In other words, the gas in the fluorescent tube is nonconductive before it is being ionized. Thus, the electric structure of the luminaire housing is such that the generation of a starting pulse is required to electrically connect both ends of the fluorescent tube to each other. Hence, the fluorescent tube prevents the risk of an electric shock during replacement by means of constructive measures.

With LED lamps, this electric safety requirement is not necessarily met. LED lamps usually comprise a printed circuit board or a corresponding structure, on which LEDs and other electronic components and drivers such as driver devices for the LEDs are mounted. The purpose of the components is to convert the alternating voltage of the power supply into directed voltage and to control the direct current required by the LEDs. In practice if one side of the LED lamp is connected to the tube holder of the luminaire housing the LED lamp is energized. In other words, the LED lamp is in a conductive state without a starting pulse. Therefore, when the LED lamp is being mounted to fluorescent luminaire housings, the contact pins at one end of the LED lamp may be connected to the contacts of one tube holder of the fluorescent luminaire housing, and the other end of the LED lamp may remain outside the fluorescent luminaire housing. In consequence the person mounting or replacing the LED lamp may touch the free pins of the LED lamp which are under voltage.

US 2011/0260614 discloses a LED lamp for replacing a fluorescent tube. The LED lamp comprises a safety unit to prevent a voltage from transferring through the LED lamp from its one end to the other until a voltage supplied from a corresponding tube holder of the luminaire housing to the pair of contact pins has been separately detected at each end of the LED lamp. Inside the LED lamp there is at least one optical line that is arranged to transfer a control or measurement signal associated with the safety unit from one end of the LED lamp to the other without capacitive leakage currents. However, the safety unit is expensive and may itself show a malfunction causing a rise of electric shock.

SUMMARY OF THE INVENTION

In view of the known prior art, it is an object of the present invention to provide a simple and inexpensive solution to prevent the occurrence of an electric shock for a user when retrofitting an LED lamp to a luminaire housing of a conventional fluorescent tube.

This object is solved by an LED lamp including an end cap and a protective cap which form a protective system for avoiding the touching of pins by a user according to the independent claim. Such an LED lamp with the protective system is easily manufactured and has low production costs per unit. Preferred embodiments are given by the dependent claims, the figures and the specification.

The LED lamp has a transparent tube and an end cap mounted to an end of the transparent tube, a pair of pins for electrically and mechanically connecting the LED lamp to a tube holder, the pair of pins extending through the end cap. A protective cap is provided for protecting the pair of pins from being touched by a user during assembly of the LED lamp to a tube holder.

LED lamps usually comprise a printed circuit board or a corresponding structure on which LEDs and other electronic components and drivers such as driver devices for the LEDs are mounted. The one or the first pair as well as the second pair of pins can respectively supported by an end cap of the LED lamp on the first and the second end of the LED lamp. The pins usually extend through the end cap such that they can be received by the tube holder. The transparent tube itself can be made out of glass or plastic, surrounding the longitudinal side of the LED lamp.

The end cap may have a circular shape. It may comprise an assembly section, a locking section and a contact section. The assembly section has a cylindrical shape and is for connecting the end cap to the tube of the LED lamp directly or via an additional fastener.

The locking section may be situated next to the assembly section. The locking section may have a cylindrical shape. It may have one to four or more notches. The notches may be embossed to a support ring protruding from the surface of the locking section. The notches may be shifted by 90 degrees at the circumference of the locking section or the support ring. The locking section further comprises a circumferential protrusion around at least one part of the outer circumference of the locking section. The at least one notch and the circumferential protrusion correspond to at least one locking means of a protective cap.

The contact section which may be located next to the locking section has an end plate attached to the locking section directly or via an additional cylindrical part. The end plate has a circumferential shape. It may have a first hole and a second hole for supporting a pair of pins. It may have a chamfered edge at the outer radius of the end plate at the interface between the end plate and the locking section or the end plate and the additional cylindrical part which is part of the contact section. This has the advantage of a simplified insertion of the locking section to the protective cap.

The protective cap has a cylindrical first section with a circular opening corresponding to the locking section of the end cap. Further it has a straight second section having a rectangular cross-section having an opening corresponding to a tube holder for an LED lamp. The first section and the second section extend perpendicular to each other and are connected to each other.

The circular opening of the cylindrical first section has a wall and an inner surface of the wall with a locking means protruding from the inner surface into the circular opening and corresponding to the circumferential protrusion of the end cap.

The locking means can be located within a hole of the wall. The wall can have at least one opening, preferably four openings shifted by 90 degree. Each locking means may have an elastic support within the opening and connected to the wall. A detent lug corresponding to a protrusion of an end cap may be attached to the support.

Furthermore at least one cog corresponding to a notch of an end cap may be attached to the support. The cog is for a haptic feedback by turning the LED lamp. The detent lug and the cog may protrude into the circular opening of the protective cap. The detent lug can be elongated and corresponds to the circumferential protrusion of the locking section. The cog is slightly rounded and corresponds to the notch of the locking section.

The end cap and the protective cap form a protective system. The connected end cap and protective cap prevents touching any parts under voltage, in particular the end pins.

In a preferred embodiment LED lamps are used with such a protective system. The end cap is used with a lighting device, preferably a LED lamp device having a first end and a second end.

Such an LED lamp may comprise an array of LEDs, one or a first pair of contact pins at a first end of the LED lamp and one or a second pair of contact pins at a second end of the LED lamp for connecting the LED lamp electrically and mechanically to a conventional tube holder for fluorescence tubes. The one or the first pair of contact pins can be connected to each other forming a first circuitry, the one or the second pair of contact pins can be connected to each other forming a second circuitry, a LED driver for supplying a at least one LED may be connected between the first circuitry and the second circuitry. The LED driver is supplied by the one or the first pair of pins and one or the second pair of pins.

The end caps can be firmly attached to the tube itself or via an additional fastener. The LED lamp may further comprise some electronic devices which can be part of an LED driver supplying several LED modules or an array of LED modules.

The protective cap can be attached to both ends of the LED lamp. The protective cap and the end cap form a protective system in use with an LED lamp.

BRIEF DESCRIPTION OF THE DRAWINGS

Preferred embodiments of the invention will be explained in the following, having regard to the drawings. It is shown in.

DETAILED DESCRIPTION OF THE INVENTION

In the following, preferred embodiments of the invention will be described with reference to the drawings. The same or similar elements or elements having the same effect may be indicated by the same reference number in multiple drawings. Repeating the description of such elements may be omitted in order to prevent redundant descriptions.

Figure 1:
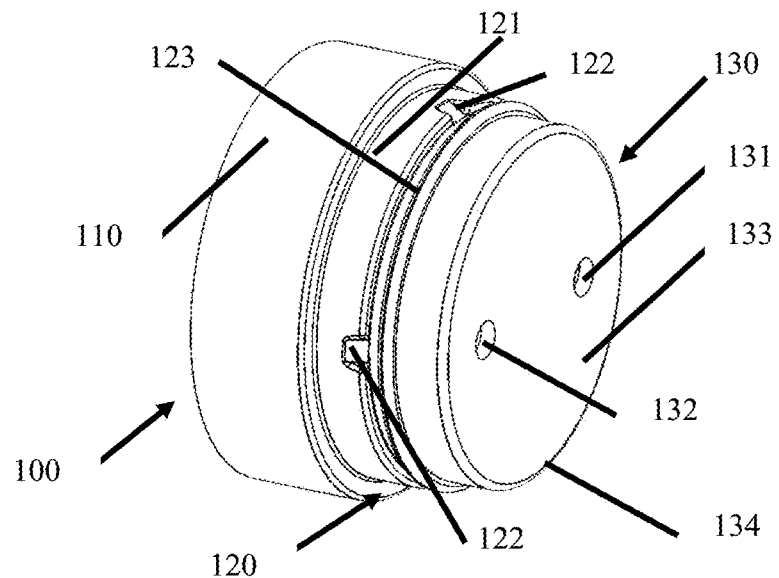
FIG. 1 shows a perspective view the end cap.

FIG. 1 shows a perspective view of an end cap 100 of an LED lamp 300. The end cap 100 has a circular shape and can be fit to the end of a tube of the LED lamp (see FIG. 4, for example). It comprises an assembly section 110, a locking section 120 and a contact section 130.

The assembly section 110 is for connecting the end cap 100 to the tube 330 of an LED lamp 300 directly or via an additional fastener. The tube 330 is intended to receive the electronic components of the LED lamp 300 such as a circuit board and an LED array which ultimately provides for the light.

The locking section 120 of the end cap 100 has a circular shape. In the embodiment shown it has four notches 122 embossed to a support ring 121 protruding from the surface of the locking section 120. The notches 122 are shifted by 90 degrees at the circumference of the locking section 120.

The contact section 130 comprises an end plate 133 attached to the locking section 120. The end plate 133 is attached to the locking section 120 via an additional cylindrical part 124. The cylindrical part 124 is part of the contact section 130. The end plate 133 has a circumferential shape.

It has a first opening 131 and a second opening 132 for receiving a pair of electrical contact pins of the LED lamp 100. The contact pins are intended to electrically connect the electronic components of the LED lamp 100 with a luminaire and in particular with the electrical contacts of a tube holder for a LED lamp of a luminaire.

The contact section 130 may have a chamfered edge 134 at the outer radius of the end plate 133 at the interface between the end plate 133 and the connection area 120. This is for a simplified insertion of the locking section 120 into a protection cap 200 which will be explained with respect to FIG. 2 below.

Figure 2:
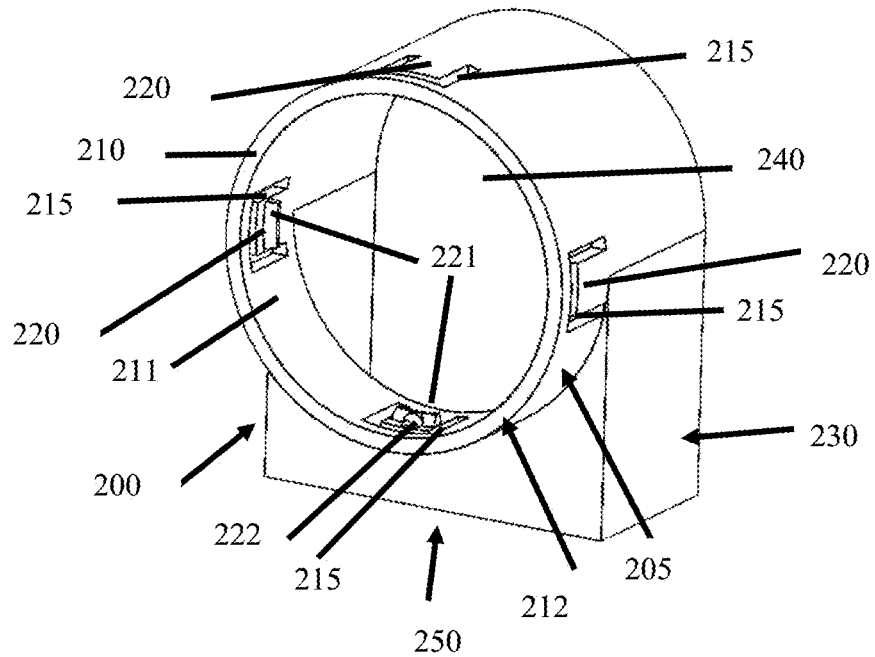
FIG. 2 shows a perspective view of the protective cap.

FIG. 2 shows a perspective view of a protective cap 200. The protective cap 200 has a cylindrical first section 205 with a circular opening 210 corresponding to the locking section 120 of the end cap 100. Furthermore a straight second section 230 having a rectangular cross-section having an opening 250 corresponding to the outer shape of a tube holder 420 for an LED lamp 300. The first section and the second section extend perpendicular to each other and are connected to each other.

The circular opening 210 of the cylindrical first section has a wall 212 and an inner surface 211 of the wall 212 with a locking means 220 protruding from the inner surface 211 into the circular opening 210 and corresponding to the circumferential protrusion 123 of the end cap 100.

The locking means 220 can be located within a hole 215 of the wall 212. The wall 212 can have at least one hole 215, preferably four holes 215 shifted by 90 degree. Each locking means may have an elastic support 225 within the hole 215 and connected to the wall 212. A detent lug 221 corresponding to a protrusion 123 of the end cap 100 is attached to the support 225. Furthermore at least one cog 222 corresponding to a notch 122 of an end cap 100 is attached to the support 225. The cog 222 is for a haptic feedback by turning the LED lamp 300. The detent lug 221 and the cog 222 protruding into the circular opening 210 of the protective cap 200. The detent lug 221 can be elongated and corresponds to the circumferential protrusion 123 of the locking section 120. The cog 222 is slightly rounded and corresponds to the notch 122 of the locking section 120.

Figure 3:
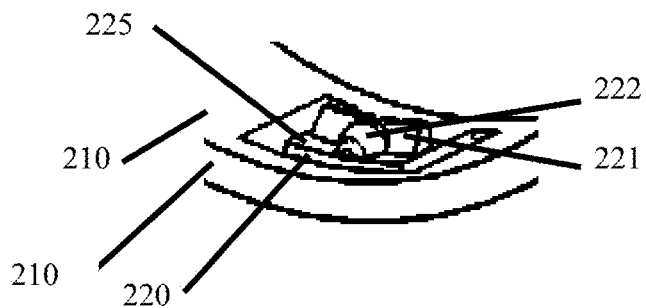
FIG. 3 shows a drawing extract of one part of the protective cap.

FIG. 3 shows a drawing extract of the locking means 220. The locking means are located in a hole 215 of the wall 212 and protruding from the inner surface 211. The locking means 220 has an elastic support 225 within the hole 215 which is connected to the wall 212. A detent lug 221 and a cog 222 are attached to the support 225 protruding into the circular opening 210. The detent lug 221 is elongated and corresponds to the circumferential protrusion 123 of the locking section 120. The cog 222 is slightly rounded and corresponds to the notch 122 of the locking section 120.

Figure 4:
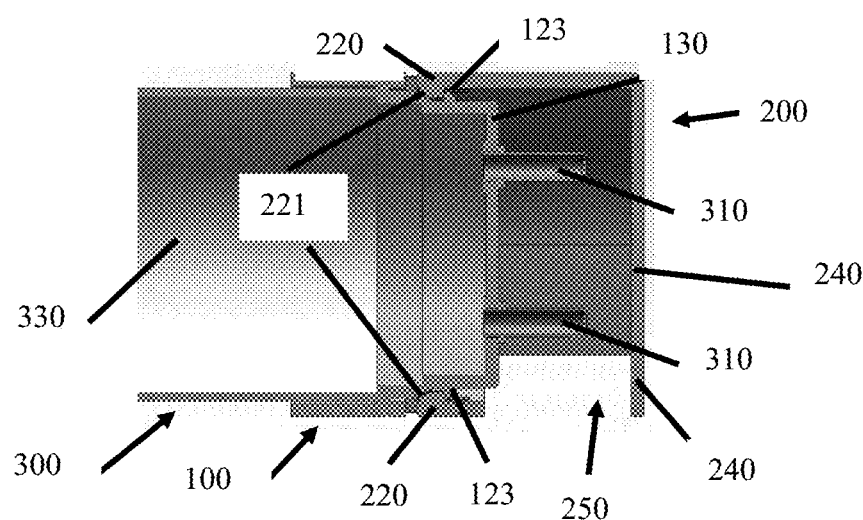
FIG. 4 shows a partial section of the protective cap and the end cap on a LED lamp.

FIG. 4 shows a partial section of the protective cap 200 and the end cap 100 on a LED lamp 130. In a state in which the end cap 100 is mounted on the tube 330 of the LED lamp 300 and the protective cap 200 is connected to the end cap 100. The elastic locking means 220 has a detent lug 221 engaging the protrusion 123 of the locking section 120 whereby the protective cap 200 is fixedly attached to the end cap 100. The back plate 240 of the protective cap 200 prevents an inadvertent contact of the first pair of pins 310 while replacing the LED lamp.

Figure 5:
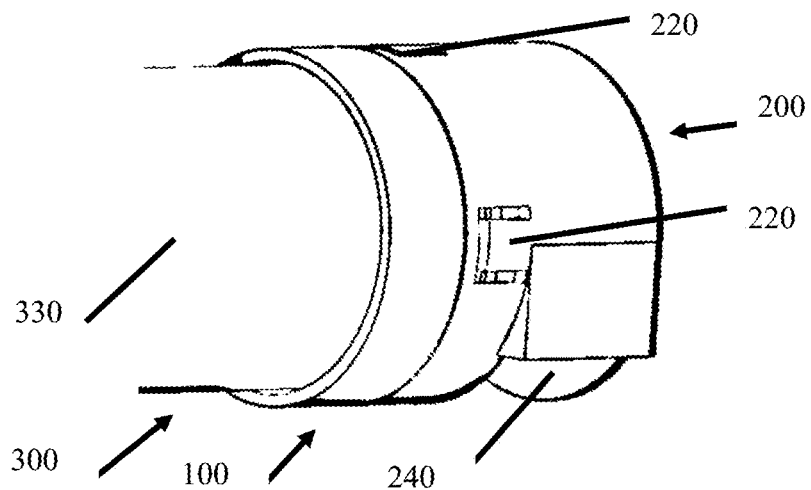
FIG. 5 shows a perspective view of the protective cap and the end cap on a LED lamp.

FIG. 5 shows a perspective view of the protective cap 200 and the end cap 100 on a LED lamp 300 according to FIG. 4 from an external view.

Figure 6:
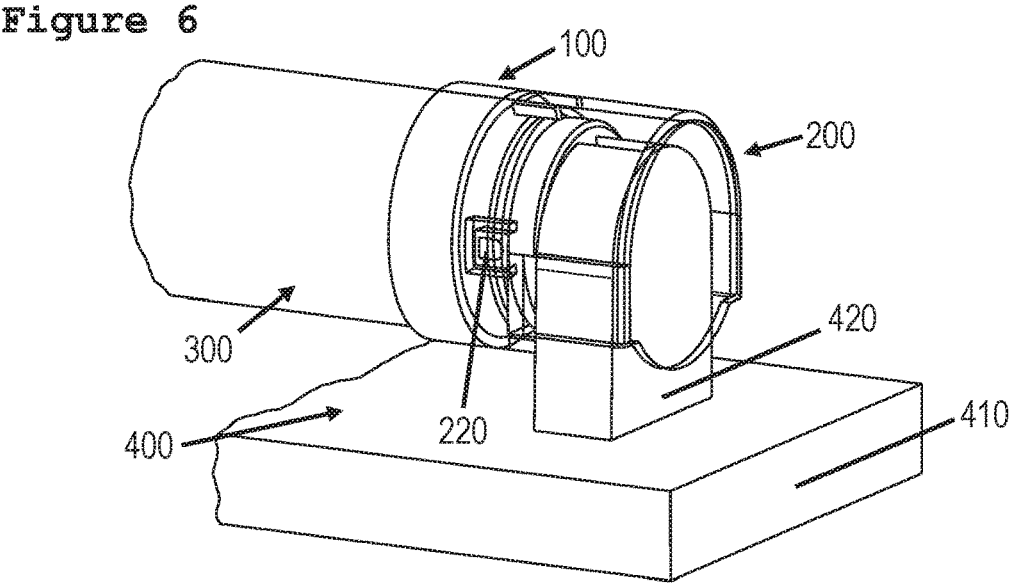
FIG. 6 shows a perspective view of the protective cap and the end cap on a LED lamp.

FIG. 6 shows a perspective view of the protective cap 200 fixedly attached to an end cap 100 on a LED lamp 300 from an external view with a luminaire housing 400. The protective cap 200 encloses a tube holder 420. The luminaire housing has a base 410 for providing electrical connection and for receiving electronic components.

Figure 7:
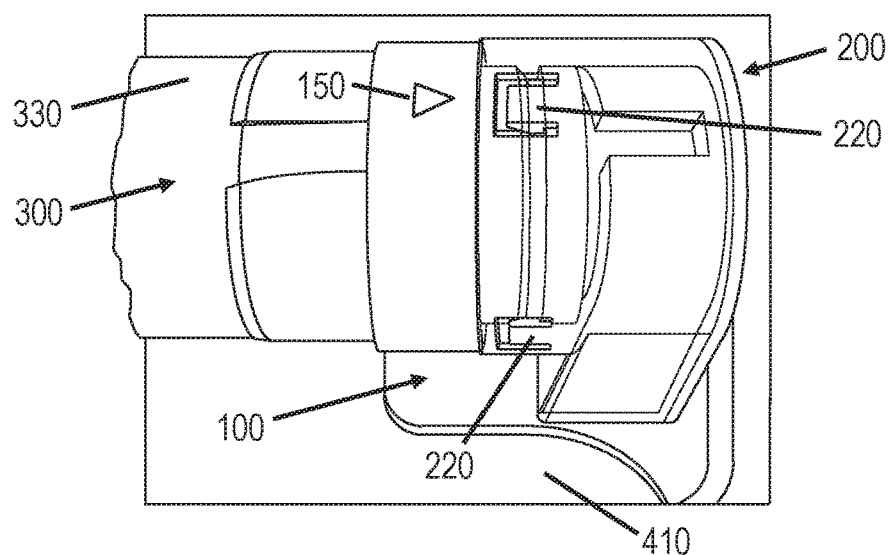
FIG. 7 shows a partial section of a perspective view of the protective cap and the end cap on a LED lamp in an unlocked position.

FIG. 7 shows a partial section of a perspective view of the protective cap 200 and the end cap 100 on a LED lamp 300 in an unlocked position. The end cap 100 is firmly attached to the tube 330 of the LED lamp 300 so that the end cap 100 rotates with the tube 330. Enabling a better handling an arrow 150 is applied on the end cap 100 corresponding to the position of the pair of pins 310, 320. Thus, the protective cap 200 need not to be transparent to enable an insertion of the pins 310, 320 to the tube holder 420. The tube holder 420 is locked by inserting the pins 310, 320 to the tube holder 420 and by turning the LED lamp 300. For this purpose the tube holder 420 has a turnable inset in a housing. The inset has a groove for inserting the pins 310, 320. In a vertical position the groove of the inset aligns with a groove of the tube holders housing. Thus, the pins 310, 320 can be inserted into the inset. Afterwards the tube holder 420 will be locked by turning the LED lamp 300 by 90 degrees to a horizontal position. In this position the grove of the inset does not align with the groove of the tube holders housing. The arrow indicates the locked or unlocked state. If the arrow 150 is on the upper side or the bottom of the LED lamp 300 the LED lamp 300 respectively the tube holder 420 is unlocked. If the arrow 150 is laterally the LED lamp 300 is locked in the tube holder 420.

Figure 8:
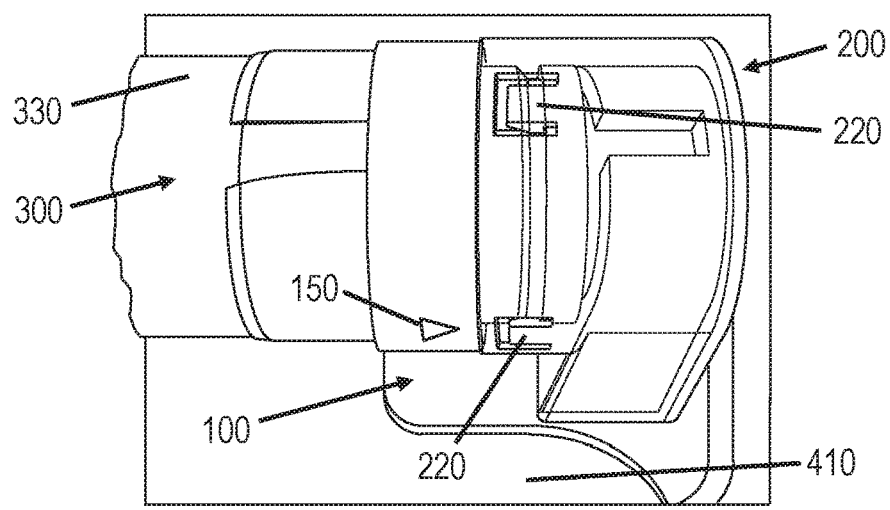
FIG. 8 shows a partial section of a perspective view of the protective cap and the end cap on a LED lamp in a locked position.

FIG. 8 shows a partial section of a perspective view of the protective cap 200 and the end cap 100 on a LED lamp 300 in a locked position. The laterally position of the arrow 150 shows this state.

Figure 9:
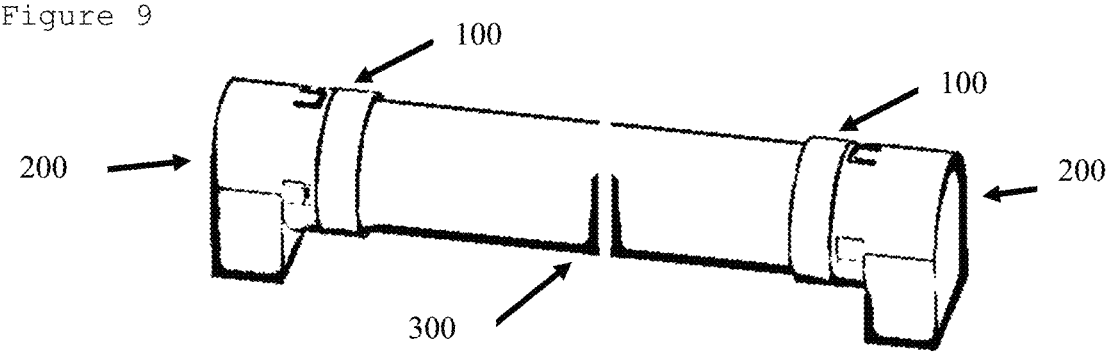
FIG. 9 shows a perspective view of the end cap on a LED lamp and protective caps on both sides of a LED lamp.

FIG. 9 shows a perspective view of an LED lamp 300 with and end cap 100 and a protective cap 200 on each end of the LED lamp 300.

Figure 10:
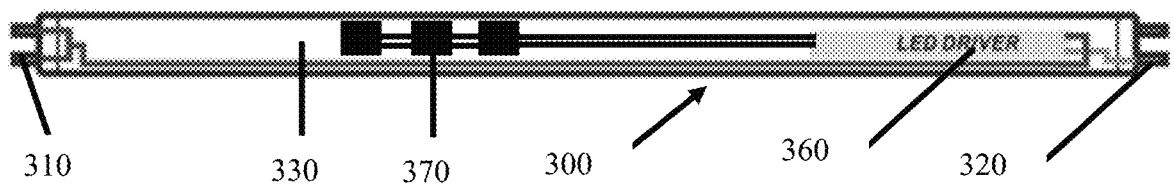
FIG. 10 shows a schematic diagram of a LED lamp.

FIG. 10 shows a schematic layout of a LED lamp 300. The LED lamp 300 comprising a first pair of pins 310 and a second pair of pins 320 at each end of the LED lamp 300 as standard interface for supplying the LED lamp 300 with power. The LED lamp 300 further comprises an LED driver 360 for supplying several LED modules 370 with energy and rectifying the AC supply voltage 440. The LED driver 360 is connected to der first pair of pins 310 and to the second pair of pins 320.

Figure 11:
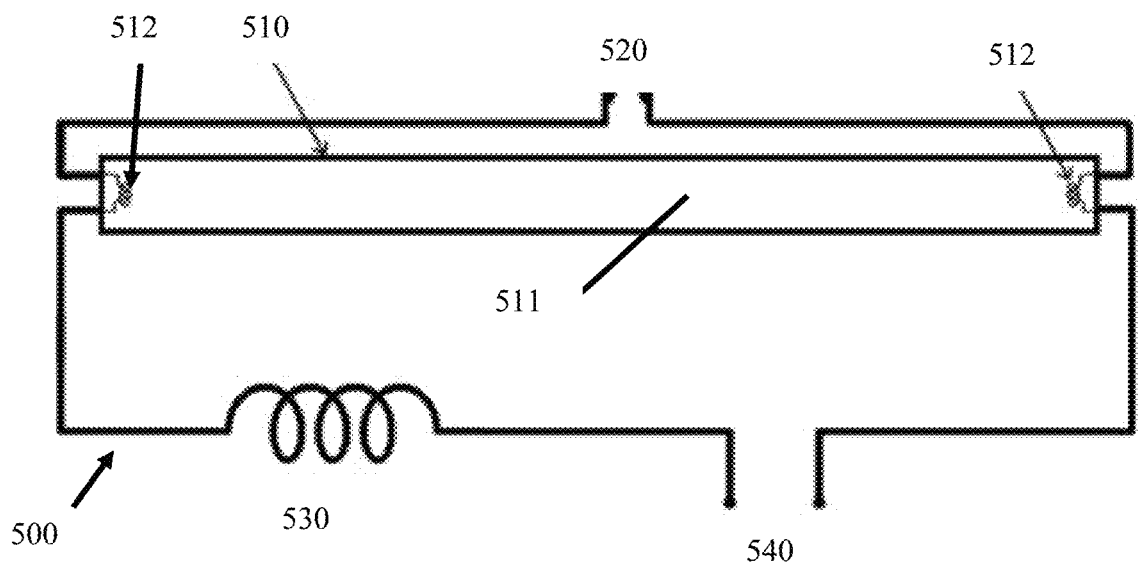
FIG. 11 shows a circuit diagram of a conventional fluorescence tube respectively a LED lamp within the lamp holder.

FIG. 11 shows a schematic layout of a conventional lightning device 500 comprising a fluorescence tube 510 having a glass tube 511 and a pair of hot cathodes 512 at each end of the fluorescence tube 510 for heating the gas into the glass tube 511. The lightning device 500 further comprises a starter 520 and a load 530 for generating a voltage pulse to striking the fluorescence tube 510. The lightning device 500 is usually connected to an AC power supply 540 providing the supply voltage.

Figure 12:
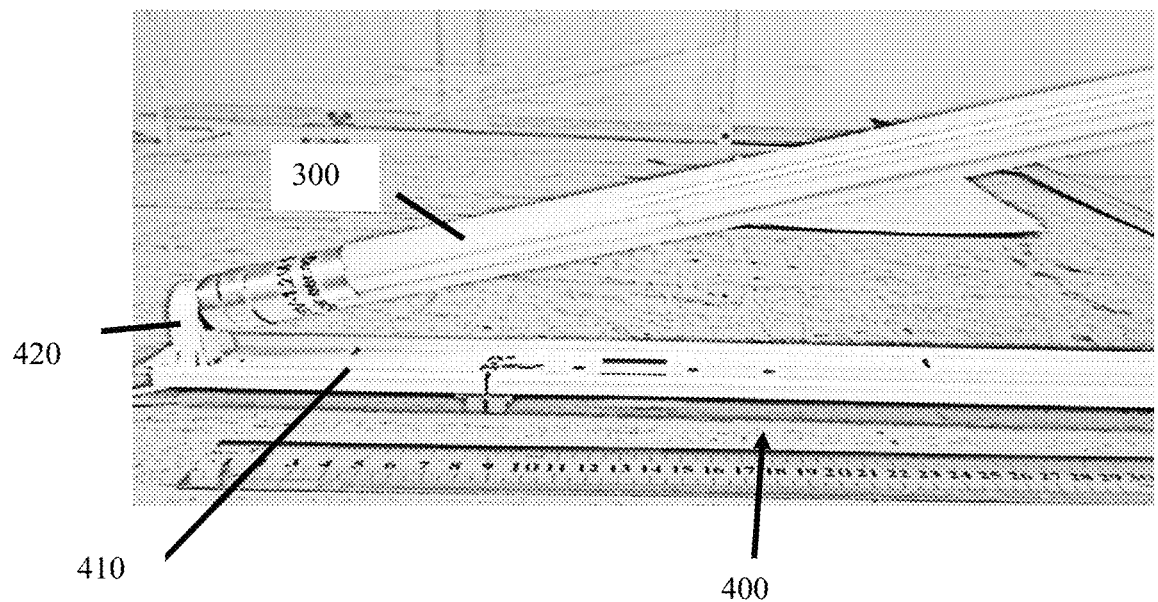
FIG. 12 shows a perspective view of a luminaire housing with a LED lamp.

FIG. 12 shows a conventional lighting device according to FIG. 6 with a luminaire housing 400 comprising a base 410 as assembly plate with a pair of tube holders 420 (only one shown). The LED lamp 300 according to FIG. 6 is connected with one side and respectively the first pair of pins 310 to the tube holder 420. Thus, the free second pair of pins 320 is energized via the LED driver 360 and an electric shock can occur.

Although the invention has been illustrated and described in detail by the embodiments explained above, it is not limited to these embodiments. Other variations may be derived by the skilled person without leaving the scope of the attached claims.

Generally, "a" or "an" may be understood as singular or plural, in particular with the meaning "at least one", "one or more", etc., unless this is explicitly excluded, for example by the term "exactly one", etc.

In addition, numerical values may include the exact value as well as a usual tolerance interval, unless this is explicitly excluded.

Features shown in the embodiments, in particular in different embodiments, may be combined or substituted without leaving the scope of the invention.

LIST OF REFERENCE NUMERALS

100 End cap
110 Assembly section
120 Locking section
121 Support ring
122 Notch
123 Protrusion
124 Cylindrical part
130 Contact section
131 First hole
132 Second hole
133 End plate
134 Chamfered edge
150 Arrow
200 Protective cap
205 First section
210 Circular opening
211 Inner surface
212 Wall
215 Hole
220 Locking means
221 Detent lug
222 Cog
225 Support
230 Second section
240 Backplate
250 Opening
300 LED lamp
310 First pair of pins
320 Second pair of pins
330 Tube
360 LED driver
370 LED modules
400 Luminaire housing
410 Base
420 Tube holder
500 Conventional lightning device
510 Fluorescent tube
511 Glass tube
512 Hot cathode
520 Starter
530 Load
540 AC power supply

The invention claimed is:

1. A light-emitting diode (LED) lamp comprising:
a transparent tube;
an end cap mounted to an end of the transparent tube;
a pair of pins for electrically and mechanically connecting the LED lamp to a tube holder, the pair of pins extending through the end cap; and
a protective cap over the pair of pins thereby protecting the pair of pins from being touched by a user.

2. The LED lamp according to claim 1, wherein the protective cap comprises:
a receiving section comprising an opening for receiving a portion of the end cap; and
a connection section with an opening for receiving a tube holder.

3. The LED lamp according to claim 2, wherein the end cap comprises:
a locking section with a cylindrical shape to be received in the receiving section of the protective cap;
a circumferential protrusion around at least one part of an outer circumference of the locking section; and
at least one notch at the outer circumference of the locking section corresponding to at least one lock of the protective cap.

4. The LED lamp according to claim 3, wherein the end cap has a chamfered edge at an outer radius for improving insertion of the locking section into the receiving section of the protective cap.

5. The LED lamp according to claim 4, wherein the locking section has four notches.

6. The LED lamp according to claim 5, wherein the four notches are shifted by 90 degrees at a circumference of the locking section.

7. The LED lamp according to claim 5, wherein the locking section has a support ring protruding from a surface of the locking section and the four notches are embossed to the support ring.

8. The LED lamp according to claim 3, wherein the at least one lock of the protective cap has an elastic support.

9. The LED lamp according to claim 8, further comprising a detent lug corresponding to a protrusion of the end cap, wherein the detent lug is attached to the support.

10. The LED lamp according to claim 9, further comprising at least one cog corresponding to a notch of the end cap, wherein the detent lug is attached to the support.

* * * * *